Nov. 12, 1968 A. M. LUECK ET AL 3,409,974
PROCESS OF MAKING TUNGSTEN-BASED COMPOSITE MATERIALS
Filed July 7, 1967
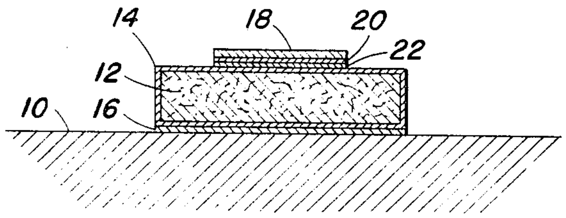
INVENTORS
Arthur M. Lueck
Jerry C. LaPlante
BY
Marn & Jangarathis
ATTORNEYS United States Patent Office 3,409,974

Patented Nov. 12, 1968

3,409,974
PROCESS OF MAKING TUNGSTEN-BASED COMPOSITE MATERIALS

Arthur M. Lueck, Kings Park, and Jerry C. La Plante, Hempstead, N.Y., assignors to Alloys Unlimited, Inc., Melville, N.Y.

Filed July 7, 1967, Ser. No. 651,893
6 Claims. (Cl. 29—420.5)

ABSTRACT OF THE DISCLOSURE

The properties that are most desirable for semiconductor mounts or pads is that they have low thermal expansion and high thermal and electrical conductivity. Ideally, they should also be easy to form, bond readily and be inexpensive. Ductile composites of tungsten-silver and tungsten-copper have been determined to be superior to materials heretofore employed in this service. The pads are made by rolling powders of the components together to form a green tape, sintering above the copper or silver melting point, rolling the sintered tape again to densify it, annealing, stamping desired shapes, and plating.

BACKGROUND OF THE INVENTION (1) *Field of the invention.*—This invention relates generally to contact pads for semiconductors and the like and, more particularly, it relates to contact pads and the like made from ductile composites which comprise discrete particles of metallic tungsten dispersed in a matrix of silver, copper or alloys thereof. The matrix material comprises about 10 to 30 weight percent of the composite. Pads made from this material have high electrical and thermal conductivity, low thermal expansion, are easy to form, will bond readily and form strong bonds, and are considerably less expensive than materials presently available.

(2) *Prior art.*—A contact or mounting pad for a semiconductive device is bonded to a metallic substrate, can or package which is to contain the device, and the semiconductive element, a chip of silicon, germanium, etc., is bonded thereto. The function of the pad is threefold: First and most important, it must protect the chip from cracking or other damage caused by thermal cycling. Second, it must of course be electrically conductive. Lastly, it must conduct heat away from the chip. The presence of such a pad is required for the first function; successful operation requires that it also perform the last two functions.

The best single material for this service is metallic tungsten. It expands very little with temperature, but conducts heat and electricity very well. Its great expense and the difficulty in working with this highly refractory metal, however, preclude its use in all applications except where expense is relatively unimportant. Prior workers have resorted to powder metallurgical techniques to overcome some of the handling and working problems. Tungsten powder is compressed and sintered to form a suitable compact, and molten silver is thereafter impregnated into the pores of the compact. This procedure is complicated by the necessity of pre-treating the tungsten with nickel or the like, to insure that the sliver will wet the tungsten during the impregnating step. Once formed, the compact is still difficult to work due to the presence of the sintered tungsten matrix.

Molybdenum is similar to tungsten in many respects and it has also been employed in this service. Its thermal and electrical properties are not quite as good as those of tungsten, but they are satisfactory, and the material is not as expensive. However, molybdenum pads have a tendency to delaminate from the substrate or base in service, and for this reason their use is avoided when possible.

Both tungsten and molybdenum are only difficultly brazable to copper, the usual substrate material, but suitable fluxes, brazing alloys and techniques are available; they are, however, costly.

The manufacture of a composite containing a dispersed tungsten phase within a matrix of a less refractory material is not novel per se. Many early workers, particularly those engaged in manufacture of vacuum tube components and heavy duty circuit breaker contacts, advocated compacting tungsten and other lower-melting powders at high pressures, followed by a heat treatment at a temperature above the melting point of the less-refractory component (U.S. Patent No. 1,346,192, issued July 13, 1920, is an example). For circuit breaker applications, silver and copper were preferred as the matrix metal for obvious reasons. Later workers determined that pretreatment of the tungsten, in particular initial compaction followed by grinding to form agglomerate particles, was necessary to achieve a good product (U.S. Patent No. 2,179,960, issued Nov. 14, 1939). Still more recently, it has been suggested that tungsten-silver compacts, after sintering at 2000° C., be brushed with nickel powder prior to infiltration or impregnation with molten silver (U.S. Patent No. 2,851,-381, issued Sept. 9, 1958).

As the technology of dealing with tungsten powder has progressed, it has thus been accompanied by an increasing awareness of the problems associated therewith. The above-noted patents only highlight this, together with the fact that skilled artisans have been working with these materials for over forty years.

Traditional powder metallurgical compaction techniques have called for the use of a suitable binder to be incorporated with the metal particles in instances where the resulting compact did not possess sufficient structural integrity to withstand subsequent handling. The binder volatilizes during firing. Generally, this was confined to cold compaction procedures, or instances where the resulting shape was inherently weak until sintered. However, a recent patent has suggested an apparatus for rolling tungsten and uranium oxide into a sheet without binders (U.S. Patent No. 3,245,114, issued Apr. 12, 1966).

OBJECTS AND BRIEF DESCRIPTION OF THE INVENTION

It is a general object of the present invention to provide an improved contact pad for semiconductors and the like.

A further object is to provide a contact pad for semiconductors and the like which is relatively inexpensive and easy to fabricate.

Yet another object of the invention is to provide a composite material containing from 70–90% by weight of discrete tungsten particles in a matrix of a lower melting metal such as copper or silver, which composite is dense, ductile, stamps readily, and has expansion and conductivity properties similar to tungsten.

Still another object of the invention is to provide a method of producing the composite material and semiconductor pads of the invention.

Various other objects and advantages of the invention will become clear from the following description of the method and the product thereof, and the novel features will be particularly pointed out in connection with the appended claims.

In essence, the method of the invention comprises rolling the mixed, powdered raw materials to produce a green tape, sintering above the melting point of the matrix metal, rolling the sintered tape to densify it, annealing, stamping desired shapes, and plating the finished pieces. The very desirable properties of the product are discussed hereinbelow.

THE DRAWING

In the following detailed description of the invention, reference will be made to the single accompanying drawing, which is a cross-sectional elevation view of a semiconductor mounting pad mounted on a substrate and with a semiconductor chip bonded thereto.

DESCRIPTION OF EMBODIMENTS

The method of the invention will be described first.

Powdered tungsten and silver or copper are mixed together, the powders being at least minus 100 mesh and preferably minus 10μ. A few hours of mixing in a jar mill produces a satisfactory dispersion. The preferred composition is 80 wt. percent W and 20 wt. percent Cu or Ag, but 70–90 wt. percent W and 10–30 wt. percent Cu or Ag are satisfactory. No binders are added. The mixed powders are fed by gravity between the rolls of a horizontal rolling mill, with the distance between the rolls being no more than about 0.05 inch. This produces a tape which can be handled with reasonable care.

That the two powders may be pressed together into a tape in this manner is considered quite surprising. The early workers produced compacts by filling molds with mixed powder, often with a binder, and subjecting the blend to very high ram pressure. This is a very different matter than feeding loose powder between two rolls; while not wishing to be bound to any particular theory of operation, it is considered at least possible that the relatively narrow roll setting in effect grinds the powders together or in some way deforms the particles, or a portion of them, creating new nascent surfaces which can bond together at the effective pressure between the rolls, believed to be a relatively low pressure. In any event, a tape strong enough to withstand handling with reasonable care is produced.

The tape is fed onto a belt passing through a sintering furnace. A hydrogen atmosphere is provided in the furnace, and the temperature is maintained above about 1000° C. when silver is the matrix metal, and above about 1100° C. when copper is the matrix metal. Sintering time is sufficient to melt all the matrix metal, usually about 0.5–2.0 minutes. After sintering the tape should be cooled, still in a reducing or neutral atmosphere, until it reaches a temperature where oxidation is no problem. The sintering tape is cooled and rolled again to effect about a 30/50% reduction. Generally, more than about 50% reduction should be avoided or there is danger of destroying the continuity of the matrix, causing cracking and embrittlement.

The rolling operation will, of course, work harden the matrix metal, and an anneal is necessary. This is carried out at nominal annealing temperatures for silver or copper, as the case may be. These range about 450° C. to 850° C.; the anneal is carried out for a period sufficient to produce a fully recrystallized matrix structure, at least about 20 minutes at the lower annealing temperatures. Annealing is also carried out in a neutral or reducing atmosphere, hydrogen being preferred.

After annealing, the desired shapes are stamped from the sheet. One of the surprising aspects of the invention is the relative ease with which this operation is performed, and the cleanliness of the product. Forming of desired shapes from high-tungsten products has been very difficult heretofore, and generally required expensive lapping and other steps to obtain a suitable product.

To facilitate brazing the stamped shape is plated, preferably with nickel, silver or copper, prior to installation in the device. Plating may be electrolytic or electroless, and no problems are encountered with conventional techniques.

As noted above, it is preferred to roll the powder initially to no more than 0.05 inch thickness. It is often desired, however, to produce composites having a thicker cross-section than this figure. When a thicker section is desired, the rolls are opened to twice or even triple the above figure, and a previously-prepared sintered (but not rolled) strip is inserted therein. Powder is then fed into the rolls on one or both sides of the strip, and a composite, thicker strip is produced. There is an upper limit on how many times this can be done, however, due to the fact that in rolling the strip with the powder, some reduction of the strip takes place. If the operation is repeated to the extent that reduction of the original strip is too great for the matrix to remain continuous, an unsatisfactory product will be produced. Composites as thick as .150 inch have been successfully produced in this manner. Of course, if even thicker composites are required the stamped shapes can be "stacked" and bonded by conventional methods.

The completed devices are installed by conventional brazing techniques, using ordinary brazing alloys for the particular system involved, the "system" being the metal plating on the pad and the metal of the substrate. The fact that bonding is quite easy and effective is in itself a substantial advantage over prior art devices.

A semiconductor pad mounted in place is shown in the drawing, which represents a partially completed high power diode device. A massive copper substrate 10 is provided as one contact and a heat sink. The mounting pad 12 is a disk having nickel plating 14 on the surface thereof. It is attached to substrate 10 by a layer of brazing alloy 16. A good brazing alloy in this service is gold/germanium eutectic alloy. The semiconductor device 18 will be provided with a nickel plated layer 20 on its under-surface, and is brazed to pad 10 by brazing alloy 22. This can also be the Au/Ge eutectic.

The true merit of the present invention can be seen from a comparison of certain physical properties of composites made in accordance with the invention with those of tungsten, molybdenum, copper and Kovar. Such a comparison is set forth hereinbelow in Table I. Composition A is an 80% W–20% Cu composite made in accordance with the invention.

TABLE I

| Property | W | Mo | Kovar | Comp. A | Cu |
|---|---|---|---|---|---|
| Density g./cc. at 20° C. | 19.3 | 10.2 | 8.36 | 15.7 | 8.96 |
| Linear Coeff. Expansion micro in./in./° C. | 4.3 | 4.9 | 4.5<br>6.2 | 6.4 | 16.5 |
| Thermal Conductivity at 20° C. Cal./cm.²/m.c/° C./sec. | 0.4 | 0.35 | 0.05 | 0.4 | 0.941 |
| Electric Conductivity, percent IACS | 31 | 29.2 | 3.4 | 29.8 | 100 |
| Electrical Resistivity micro ohm cm. at 20° C. | 5.5 | 5.7 | 48.9 | 5.9 | 1.67 |

From the foregoing, it can be seen that pads made in the particular manner taught herein have most beneficial properties. When it is considered that they are cheaper by a factor of about 4 than pure tungsten (3 times cheaper than molybdenum), their utility in this service becomes manifest.

In summary, the old art of producing sintered tungsten compacts has been refined and, when the particular method herein described and claimed is followed, a product is produced which, because of its properties, is particularly well suited for use as a mounting pad for semiconductors. It will of course be understood that various changes in the details, steps, materials and products, which have been herein described and illustrated in order to explain the nature of the invention, may be made by those skilled in the art within the principle and scope of the invention as defined in the appended claims.

What is claimed is:

1. The method for producing flat, ductile, tungsten composite shapes having relatively high electrical and thermal conductivity and relatively low thermal expansion, comprising the steps of:

mixing together without added binders minus 100 mesh powders of tungsten and copper or silver, said tungsten comprising from about 70 wt. pct. to about 90 wt. pct. of the mixture;

feeding said mixed powder between rolls spaced no more than about 0.05 in. apart to form a green tape;

sintering said green tape in a neutral or reducing atmosphere at a temperature above the melting point of said silver or copper to form a sintered tape;

rolling said sintered tape to effect a reduction of from about 30% to about 50%;

annealing the rolled tape under conditions controlled to fully recrystallize said silver or copper; and stamping desired shapes from the annealed tape.

2. The method as claimed in claim 1, wherein said powders are minus 10 microns.

3. The method as claimed in claim 1, wherein said sintering is carried out at a temperature within the range of about 1000° C. to about 1300° C.

4. The method as claimed in claim 1, wherein said annealing step is carried out in a neutral or reducing atmosphere, at a temperature within the range of about 450° C. to about 850° C.

5. The method as claimed in claim 1, and additionally comprising nickel plating the stamped shape.

6. The method as claimed in claim 1, and additionally comprising feeding a sintered tape through said rolls in addition to said powder, said rolls being spaced no more than about 0.05 in. farther apart than the thickness of said tape.

References Cited

UNITED STATES PATENTS

| | | | |
|---|---|---|---|
| 2,198,253 | 4/1940 | Koehring | 75—208 X |
| 2,758,336 | 8/1956 | Franssen | 18—9 |
| 2,851,381 | 9/1958 | Hoyer | 29—182.1 X |
| 2,987,778 | 6/1961 | Worn | 18—59.3 |
| 3,125,441 | 3/1964 | Lafferty | 29—182.1 X |
| 3,150,974 | 9/1964 | Lund | 75—208 |
| 3,276,103 | 2/1965 | Köpke | 75—208 X |
| 3,290,124 | 12/1966 | Holtzclaw | 29—182.1 |
| 3,331,684 | 7/1967 | Storchheim | 75—214 X |

FOREIGN PATENTS

| | | |
|---|---|---|
| 581,742 | 8/1959 | Canada. |
| 600,716 | 6/1960 | Canada. |
| 1,027,041 | 9/1958 | Germany. |
| 773,722 | 5/1957 | Great Britain. |

CARL D. QUARFORTH, *Primary Examiner.*

A. J. STEINER, *Assistant Examiner.*